(12) United States Patent
Kawamura et al.

(10) Patent No.: US 6,596,788 B2
(45) Date of Patent: Jul. 22, 2003

(54) BIODEGRADABLE COMPOSITION AND METHOD OF PRODUCING THE SAME

(75) Inventors: Masanobu Kawamura, Iwakuni (JP); Eiji Nishijima, Iwakuni (JP); Masahiko Tabata, Goutsu (JP); Makoto Arai, Kita-ku (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 0 days.

(21) Appl. No.: 09/944,077

(22) Filed: Sep. 4, 2001

(65) Prior Publication Data

US 2002/0061583 A1 May 23, 2002

(30) Foreign Application Priority Data

Sep. 25, 2000 (JP) .......................... 2000-289771
Apr. 4, 2001 (JP) .......................... 2001-105703

(51) Int. Cl.$^7$ ................................. C08K 5/00
(52) U.S. Cl. ....................................... 523/124
(58) Field of Search .............................. 523/124

(56) References Cited

U.S. PATENT DOCUMENTS

| 3,850,863 A | 11/1974 | Clendinning et al. |
| 3,909,468 A | 9/1975 | Tanaka et al. |
| 4,288,550 A | * | 9/1981 | Ishida et al. ............ 435/167 |

FOREIGN PATENT DOCUMENTS

| DE | 43 42 514 | 6/1995 |
| FR | 2 292 005 | 6/1976 |
| JP | 8-157288 | 6/1996 |

OTHER PUBLICATIONS

Chemical Abstracts, AN 91:37803 CA, XP–002194899, JP 54 005830, Mar. 22, 1979.
Derwent Publications, AN 1996–006660, XP–002194902, JP 07 285108, Oct. 31, 1995.
Derwent Publications, AN 1976–64050X, XP–002194903, JP 51 077643, Jul. 6, 1976.
Derwent Publications, AN 1996–339023, XP–002194904, JP 08 157288, Jun. 18, 1996.
Chemical Abstracts, AN 132:195231 CA, XP–002194900, CN 1 191 867, Sep. 2, 1998.
Chemical Abstracts, AN 122:189391 CA, XP–002194901, JP 06 322181, Nov. 22, 1994.

* cited by examiner

*Primary Examiner*—Kriellion A. Sanders
(74) *Attorney, Agent, or Firm*—Oblon, Spivak, McClelland, Maier & Neustadt, P.C.

(57) ABSTRACT

Disclosed is a biodegradable composition characterized by compounding yeast (A) and biodegradable plastic (B) at a particular proportion. The purpose is to provide a biodegradable composition having very good biodegradability and additional fertilizer effect, making good use of the characteristics of yeast.

11 Claims, No Drawings

BIODEGRADABLE COMPOSITION AND METHOD OF PRODUCING THE SAME

BACKGROUND OF THE INVENTION

The present invention relates to a composition useful as a biodegradable material.

In recent years, an interest in "biodegradable plastic" is very high. The biodegradable plastic referred to so in the invention means "a plastic that can be used similarly to ordinary plastics during use, becomes low-molecular compounds through the participation of microbes or moisture in the natural world after use, and finally decomposes into water and carbon dioxide", and is expected particularly to be applied in the fields of agriculture and forestry. For example, when applying to multifilm, if the film is unnecessary to be collected after harvest and it can be degraded only by plowing back, the labor saving will be possible. However, traditional biodegradable plastics have such problems that the biodegradation rate is not necessarily enough, and the like.

With respect to the biodegradable material capable of converting to film, moldings, etc., the purpose of the invention is to provide a biodegradable composition that allows drastic labor saving particularly in the fields of agriculture and forestry, because of easy biodegradation and additional fertilizer effect etc. as well, and a method of producing the same.

As a result of diligent investigations, the inventors have found that a composition obtainable by formulating yeast and biodegradable plastic at a particular proportion can solve the subject as described above, leading to the completion of the invention.

SUMMARY OF THE INVENTION

The invention relates to a biodegradable composition comprising yeast (A) and biodegradable plastic (B) at a particular proportion. The purpose is to provide a biodegradable composition having very good biodegradability and additional fertilizer effect, making good use of the characteristics of yeast.

DETAILED DESCRIPTION OF THE INVENTION

The yeast (A) to be used in the invention is not particularly restricted, and baker's yeast, alcohol yeast, sake yeast, further brewer's yeast produced in large quantities, and the like can be used.

As the examples of such yeasts, *Saccharomyces cerevisiae* (IFO 1954, IFO 0309, IAM 4274), *Candida utilis* (IFO 0619, ATCC 15239), *Torulopsis nodaensis* (IFO 1942), *Torulopsis stellata* (IFO 1953), *Hansenula anomala* (IFO 1150), etc. are mentioned.

Moreover, yeasts after treatment of extraction etc. such as yeast after extracted nucleic acid (denucleated yeast) are also useful.

The yeast can be used as a lump of yeast, but it is preferable for yeast to be in the shape of passing through a screen with mesh opening of 53 $\mu$m by pulverization etc. In the case of yeast in the shape of not passing through a screen with mesh opening of 53 $\mu$m, the flexibility of film becomes poor when converting to film. More preferable is a yeast in the shape of passing through a screen with mesh opening of 38 $\mu$m.

The yeast contains nitrogen, phosphoric acid and potassium being three big components of fertilizer in abundance and is an organic fertilizer with very high composting effect. Moreover, amino acid In the yeast is taken into the plant body and has also an action of increasing flavor.

Furthermore, the cell wall of yeast consisting of polysaccharides such as glucan and mannan is subject to decomposition in the soil, and the decomposed products are conducive to useful microbes in soil as sugar sources to take part in the propagation thereof, thus bringing about a thickening effect on fruits.

For the biodegradable plastic (B) to be used in the invention, the thermoplastic biodegradable resins known currently as biodegradable plastics are usable, and, for example, resins produced by microbes such as polyhydroxybutyrate, chemically synthesized resins such as polycaprolactone, poly(butylene succinate), poly(butylene succinate·adipate), poly(ethylene succinate), poly(glycolic acid), poly(lactic acid) and poly(vinyl alcohol), and further resins obtained by modifying natural products such as cellulose acetate and thermally plasticized starch are usable. In particular, biodegradable polyester is preferable from the aspect of physical properties. As the biodegradable polyesters, polycaprolactone, poly(butylene succinate), poly(butylene succinate·adipate), poly(ethylene succinate), poly(glycolic acid), poly(lactic acid), etc. as described above are mentioned. These can be used also by combining two or more kinds.

It is required that the formulating proportion of yeast (A) to biodegradable plastic (B) is within a range of following general formula 1. Besides, in the invention, these indicate dry weights.

A: 90~10 parts by weight B: 10~90 parts by weight $A+B$=100 parts by weight         General formula 1

If the proportion of yeast (A) exceeds 90 parts by weight, then the flexibility cannot be obtained at all when converting to moldings, and, in particular, when converting to film etc., the use becomes difficult. Also, if the proportion of yeast (A) is under 10 parts by weight, then the promotion of biodegradation rate becomes insufficient. More preferable is a range of general formula 2.

A: 50~10 parts by weight B: 50~90 parts by weight $A+B$=100 parts by weight         General formula 2

The inventive composition allows to adjust the biodegradation rate depending on the uses. For example, when the biodegradation rate is too fast depending on the use, it is possible to make the biodegradation rate slower, by additionally formulating lignin with low hydrophilicity, than that before formulation. The formulation level of lignin is preferable to be within a range of not exceeding 40 parts by weight based on 100 parts by weight of yeast used. If exceeding 40 parts by weight, then the inhibitory effect of the biodegradation becomes significant. Moreover, since lignin is used for the purpose of inhibiting the biodegradation, lignin with lower hydrophilicity is advantageous. Lignin with higher hydrophilicity will be dissolved out with rainwater to inversely promote the biodegradation of moldings. Concretely, the content of organic sulfur in lignin is preferable to be 3% by weight or less. The content of organic sulfur indicates the extent of hydrophilicity of lignin and becomes an index of solubility into water.

The inventive composition can be used in combination with natural high-molecular polysaccharides and their derivatives produced industrially in large quantities such as cellulose, starch and chitin-chitosan, within a range of not deviating from the gist of the invention. As the celluloses, wood pulp fibers manufactured through sulfite process and kraft process, regenerated cellulose, cotton, raw cotton, etc. can be mentioned and wood pulp fibers produced in large quantities are preferable. Moreover, mechanical pulp, wood flour, bamboo flour, etc. containing relatively more lignin are also usable. Furthermore, in the invention, plasticizer, blowing agent, dye and pigment, agricultural chemicals, etc. used commonly can also be added, if need be, for use. Fertilizer component may be added additionally. The addition levels thereof are determined appropriately depending on the purposes, but it is preferable to be within a range of not exceeding 80 parts by weight based on 100 parts by weight of the inventive biodegradable composition.

The inventive biodegradable composition is ordinarily converted to moldings, after yeast and biodegradable plastic are formulated at a fixed proportion and kneaded. The kneading equipment and molding equipment used are not particularly restricted and equipments known hitherto can be used.

For example, as the kneading equipments, roll mill, intensive mixer, single-screw extruder, double-screw extruder, etc. are mentioned. It is required to set the kneading temperature over the melting point of biodegradable plastic for melting and kneading, but it can be altered appropriately depending on the characteristics of raw material, formulation ratio, kneading situation, etc.

Moreover, if the yeast and biodegradable plastic are molten and kneaded in the presence of 3 to 20% by weight of moisture based on yeast, then the mixing is performed more homogeneously, which is preferable. To say further, the moisture is preferable to be 5 to 18% by weight. The moisture is supplied to the mixing system from that contained in yeast beforehand, but it can be supplied from outside upon kneading as well. When the moisture exists, the yeast exhibits a plasticizing effect. If the moisture is under 3% by weight, then the homogenization between yeast and biodegradable resin becomes insufficient and, if over 20% by weight, the physical properties decrease when converted to film etc. Besides, the quantity of moisture means % by weight based on the dry weight of yeast.

When the moisture exists as described above, it is preferable to use biodegradable plastic with melting point of not higher than 120° C. as the biodegradable plastic (B). As the biodegradable plastics with melting point of not higher than 120° C., for example, polycaprolactone, poly(butylene succinate), poly(butylene succinate adipate), poly(ethylene succinate), etc. are mentioned. Besides, the melting point in the invention can be measured using differential scanning calorimeter, according to JIS K7121.

Moreover, as the methods for molding, for example, casting process (solution casting process), extrusion process (melt extrusion process) using T die or inflation die, calender process, biaxial drawing process, etc. are mentioned. Furthermore, surface oxidation, laminating, coating, vacuum metallizing, antistatic treatment, foaming treatment, etc. are also possible.

Besides, when the inventive biodegradable resin composition is molded into film etc., if the moisture exists in large quantities, the film will be foamed, hence it is preferable to keep the excess moisture removed. In this case, it is possible to cope appropriately by means of suction dewatering during kneading with extruder etc., and the like.

The processed composition can be used, for example, for the agricultural materials such as multifilm for agriculture, seedling pot, sandbag and vegetation mat, and for the uses known hitherto such as compost bag, loose buffer, draining bag, thermal insulator, water retentive sheet and tape.

In following, the invention will be illustrated more concretely based on examples, but the invention is not confined to that range. Besides, part and % in the examples indicate part by weight and % by weight, respectively, so long as there is no notice particularly.

Test Items and Testing Methods (1) Test of Biodegradability

Specimens were laid under ground and collected after 3 weeks and 6 weeks to judge the state visually.

○: Specimen retaining no traces of original shape,

Δ: Specimen with broken places recognized,

X: Specimen with little change recognized.

Testing site: Testing field of Research Laboratory of Chemicals Development, Nippon Paper Industries Co., Ltd. Iida-machi, Iwakuni-shi, Yamaguchi-ken (2) Tensile Stretch at Breaking Point of Film The tensile stretch (%) at breaking point of specimen was measured under following conditions.

When film was broken immediately without stretch after start of test, the tensile stretch at breaking point was put at 100%.

Tester: Tensile tester (Tensilon, from Toyo Seiki)

Speed: 100 mm/min

Load cell: 100 kg

Span: 30 mm

Temperature: 23° C.

Humidity: 50%

EXAMPLE 1

Denucleated yeast (trade name: Yeast B, from Nippon Paper Industries Co., Ltd., moisture 7%) was classified through a screen with mesh opening of 38 µm. Both 21.5 parts (dry weight 20 parts) of denucleated yeast having passed through screen and 80 parts of poly(butylene succinate-adipate) (trade name: Bionole #3001, melting point 94° C., from Showa Highpolymer Co., Ltd.) were kneaded at a temperature of 150° C., using Labo Plastmill (from Toyo Seiki Co., Ltd.). After kneading, hot molding was performed under following conditions to fabricate a 100 µm thick film, which was used as a sample. The test results are shown in Table 1.

Conditions of Hot Press

Temperature: 150° C.

Pressure: 220 kg/cm$^2$

Retention time: about 10 minutes

EXAMPLES 2 AND 3

Except that the proportions of denucleated yeast to poly (butylene succinate-adipate) were varied as shown in Table 1, tests were implemented similarly to Example 1. Results are shown in Table 1.

EXAMPLES 4, 5 AND 6

Except that the mesh openings and the proportions of denucleated yeast to poly(butylene succinate-adipate) were varied as shown in Table 1, tests were implemented similarly to Example 1. Results are shown in Table 1.

EXAMPLE 7

Except that the denucleated yeast was changed to brewer's yeast (from Kirin Brewery Co., Ltd.), test was implemented similarly to Example 4. Results are shown in Table 1.

EXAMPLE 8

Except that 30 parts of denucleated yeast were changed to 25 parts of denucleated yeast and 5 parts of lignin (trade name: Vanillex HW, from Nippon Paper Industries Co., Ltd.) with content of organic sulfur of 2.4%, test was implemented similarly to Example 4. Results are shown in Table 1. Moreover, the content of organic sulfur was determined by following method.

Content of organic sulfur: The content of overall sulfur in lignin was determined using inductive coupling plasma emission spectral analyzer (SPS1700VRI, from Seiko Electronics Corp.). Next, the content of inorganic sulfur in lignin was determined using ion chromatograph (761Compact IC, from Metrohm Corp.), thus determining the content of organic sulfur from the difference between content of overall sulfur and content of inorganic sulfur (% based on solids).

EXAMPLE 9

Except that poly(butylene succinate adipate) was changed to polycaprolactone (trade name: Celgreen PH7, melting point 60° C. from Daicel Chemical Industries Ltd.), test was implemented similarly to Example 4. Results are shown in Table 1.

COMPARATIVE EXAMPLES 1 AND 2

Except that the proportions of denucleated yeast to poly(butylene succinate·adipate) were varied as shown in Table 1, tests were implemented similarly to Example 1. Results are shown in Table 1.

TABLE 1

| | Yeast (pts. by weight) | Bio-degradable Plastic (pts. By weight) | Others (pts. by weight) | Biodegradability 3 weeks | Biodegradability 6 weeks | Tensile stretch at breaking point (%) |
|---|---|---|---|---|---|---|
| Ex.1 | A 20 | A 80 | | Δ | ◯ | 300 |
| Ex.2 | A 40 | A 60 | | Δ | ◯ | 270 |
| Ex.3 | A 70 | A 30 | | ◯ | — | 160 |
| Ex.4 | A 30 | A 70 | | Δ | ◯ | 280 |
| Ex.5 | B 30 | A 70 | | Δ | ◯ | 250 |
| Ex.6 | C 30 | A 70 | | Δ | ◯ | 170 |
| Ex.7 | D 30 | A 70 | | Δ | ◯ | 260 |
| Ex.8 | A 25 | A 70 | Lignin 5 | X | Δ | 270 |
| Ex.9 | A 30 | B 70 | | Δ | ◯ | 270 |
| Com.1 | A 0 | A 100 | | X | X | 300 |
| Com.2 | A 100 | A 0 | | ◯ | — | 100 |

Yeast A: Denucleated yeast, passing through a screen with mesh opening of 38 μm
  B: " passing through a screen with mesh opening of 53 μm
  C: " passing through a screen with mesh opening of 125 μm
  D: Brewer's yeast, passing through a screen with mesh opening of 38 μm
Biodegradable plastic A: poly(butylene succinate·adipate)
  B: polycaprolactone

EXAMPLE 10

Denucleated yeast (trade name: Yeast B, from Nippon Paper Industries Co., Ltd.) was classified through a screen with mesh opening of 53 μm and dried. After 40 parts in terms of bone-dry weight of dried denucleated yeast, 60 parts of poly(butylene succinate·adipate) (trade name: Bionole #3001, melting point 94° C., from Showa Highpolymer Co., Ltd.) and water that adjusts the moisture so as to become 10% based on the bone-dry weight of denucleated yeast were mixed, and the mixture was molten and kneaded in kneader under following conditions. Moreover, vacuum suction was applied in kneader to remove the moisture, thus obtaining a resin composition.

Thereafter, hot molding was performed under following conditions using hot press to fabricate a 80 μm thick film, which was used as a sample. The test results of biodegradability and tensile stretch at breaking point of film are shown in Table 2.

Kneader: Unidirectional double screw kneading extruder (KZW-60 MG, from Technovel)
  Diameter of screw: ∅15 mm
  Number of revolutions: 150 rpm
  Feed: 200 g/hr
  Temperature: 130° C.
  Conditions of Hot Press
  Temperature: 140° C.
  Pressure: 230 kg/cm$^2$
  Retention time: about 3 minutes

EXAMPLES 11 AND 12

Except that the moistures based on denucleated yeast were varied to the proportions shown in Table 2, tests were implemented similarly to Example 10. Results are shown in Table 2.

EXAMPLE 13

Except that poly(butylene succinate·adipate) was changed to polycaprolactone (trade name: Celgreen PH7, melting point 60° C., from Daicel Chemical Industries Ltd.), test was implemented similarly to Example 10. Results are shown in Table 2.

COMPARATIVE EXAMPLES 3 AND 4

Except that the moistures based on denucleated yeast were varied to the proportions shown in Table 2, tests were implemented similarly to Example 10. Results are shown in Table 2.

TABLE 2

| | Yeast (pts. by weight) | Bio-degradable Plastic (pts. By weight) | Moisture (% by weight based on yeast) | Biodegradability 3 weeks | Biodegradability 6 weeks | Tensile stretch at breaking point (%) |
|---|---|---|---|---|---|---|
| Ex.10 | B 40 | A 60 | 10 | Δ | ◯ | 320 |
| Ex.11 | B 40 | A 60 | 7 | Δ | ◯ | 330 |
| Ex.12 | B 40 | A 60 | 17 | Δ | ◯ | 310 |
| Ex.13 | B 40 | B 60 | 12 | Δ | Δ | 340 |
| Com.3 | B 40 | A 60 | 2 | Δ | ◯ | 150 |
| Com.4 | B 40 | A 60 | 32 | Δ | ◯ | 140 |

Yeast A: Denucleated yeast, passing through a screen with mesh opening of 53 μm
Biodegradable plastic A: poly(butylene succinate·adipate)
  B: polycaprolactone (From Table 1) From the measurement results of tensile stretch at breaking point, with yeast alone, film does not stretch, but breaks immediately, leading to the difficulty in use as a film. Moreover, from the test results of biodegradability, with poly-(butylene succinate·adipate)

alone, the biodegradation is not sufficient. Whereas, it is shown that the inventive compositions have sufficient expansibility and also fast biodegradation.

Moreover, it is shown that, when using the yeasts in the shape of having passed through screens with mesh openings of 38 μm and 53 μm, the tensile stretch at breaking point of film is better.

Furthermore, it is shown that the compounding of lignin inhibits the biodegradation.

(From Table 2) It is shown that, by adding the moisture on melting and kneading, films good in both strength and biodegradability can be obtained.

Based on above, the effect of the invention is obvious.

What is claimed is:

1. A biodegradable composition comprising yeast (A) and a biodegradable plastic (B) at the proportion shown in a general formula 1:

A: 90~10 parts by weight B: 10~90 parts by weight $A+B=100$ parts by weight, wherein said composition is in solid form  General formula 1.

2. The biodegradable composition of claim 1, further comprising lignin in amount of not more than 40 parts by weight based on 100 parts by weight of yeast.

3. A method of producing the biodegradable composition according to claim 1, comprising melting and kneading a mixture of yeast (A) and biodegradable plastic (B) at a temperature of not lower than a melting point of (B).

4. The method of claim 3, wherein the melting and kneading are performed in the presence of moisture at 3 to 20% by weight based on yeast (A).

5. The method of claim 3, wherein the biodegradable plastic (B) has a melting point of not higher than 120.

6. The method according to claim 3, wherein the yeast is in a shape that is capable of passing through a screen having a mesh opening of 53 μm.

7. A film, comprising the biodegradable composition of claim 1.

8. The method of making the film according to claim 7, comprising hot molding the biodegradable composition.

9. The composition according to claim 1, wherein the yeast has a shape that passes through a screen with mesh opening of not more than 53 μm.

10. The composition according to claim 1, wherein the composition is capable of biodegrading in a time period ranging from 3 to 6 weeks.

11. The composition according to claim 1, wherein the composition is capable of biodegrading in a time period that is less than 6 weeks.

* * * * *